April 16, 1968 R. W. PRINCE 3,377,949
PRINTING PLATES
Filed March 28, 1966
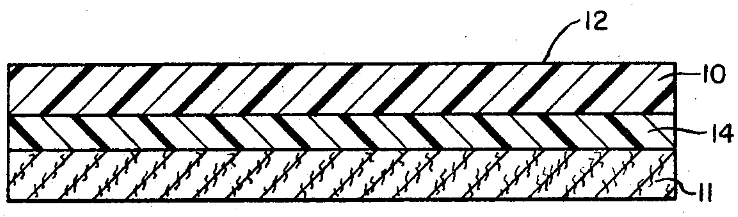

United States Patent Office 3,377,949

Patented Apr. 16, 1968

3,377,949
PRINTING PLATES

Roy W. Prince, Lexington, Mass., assignor to W. R. Grace & Co., Cambridge, Mass., a corporation of Connecticut Filed Mar. 28, 1966, Ser. No. 537,774
2 Claims. (Cl. 101—379)

This invention is directed to novel printing plates and more particularly to printing plates having compressible materials adhered thereto.

Plastic printing plates for use in flexography and certain letterpress printing applications are generally composed of a surface which possesses a relatively low durometer, e.g., 25 to 50 (Shore A) in order to print with as low pressure as possible. However, even under light printing pressures, a relatively soft printing surface is apt to distort resulting in a slurring of the transferred image. High durometer materials, on the other hand, result in embossing the paper. One attempt to overcome these disadvantages was to prepare printing plates of a laminate of rubber or plastic of differing durometers, with, for example, the printing layer having a relatively high durometer and the base layer, a lower durometer. Such structures also failed to redistribute the pressures satisfactorily. In addition, in order to increase the printing pressure in desired areas to compensate for plate irregularities, the "make-ready" procedure is employed; that is, the specific areas underneath the printing plate are built up with layers of paper. This procedure is tedious and time consuming.

A novel printing plate has now been found which does not possess the deficiencies of the prior art. The novel printing plate of the present invention comprises a volume compressible cushioning material with a layer of polymeric material thereon as a printing layer. By means of the present invention, a printing plate can be employed which has a high durometer or any desired durometer to provide clarity and faithfulness of reproduction but at the same time compensate for any unevenness in plate or paper and avoid embossing of the paper.

Referring now to the drawing, the figure shows a printing plate 12 within the scope of the present invention wherein a polymeric printing layer 10 is bonded to cushioning material 11 and barrier layer 14 prevents strike-in of the polymeric printing layer into the cushioning material. Cushioning material 11 is an impregnated fibrous web. The printing plate of the present invention is utilized by molding the plate under heat and pressure into a previously prepared matrix. Other methods known to the art are also employed to mold the plate. The thus-formed duplicate printing plates are then ready to be placed on the printing cylinder by any of the conventional means, e.g., by hooks, clamps or adhesives. The compressible material acts as a stabilizing backing for the polymeric material during the molding operation when the polymeric material is in a fluid or semifluid state, and as a cushioning material during printing evenly distributing the printing pressures.

The polymeric materials employed in the novel printing plate of the present invention are those which are conventionally utilized in duplicate printing plates. As examples, mention may be made of thermoplastic and thermosetting polymers such as polyvinyl chloride resin, natural rubber, acrylonitrile copolymers, nylon, vinylidene chloride copolymers, urethanes, ethylene/propylene terpolymer, polyesters and polyester copolymers as well as mixtures of the above materials. The printing layer is applied to the cushioning material from a solution or latex or as a lamination in the form of a film. The printing layer may also include fillers, antioxidants, cross-linking agents and plasticizers.

The cushioning material employed in the present invention is a volume compressible, resilient member. The term "volume compressible" as used herein is intended to refer to the lack of movement under compression except in a direct line of the applied pressure. The cushioning member is preferably a porous, fibrous web impregnated with an elastomeric material. The web may be a woven fabric or a non-woven sheet material. Preferably a non-woven web is employed. The fibers of the web may be natural, such as cellulosic, or synthetic, such as nylon, rayon, etc. Elastomeric foamed materials such as small-celled polyurethane, silicone or other rubber foams are also employed as the cushioning material.

Structurally, the preferred cushioning material of the present invention is characterized by an impregnated fibrous web which contains a multiplicity of very evenly distributed, interconnected, minute voids or air spaces surrounded by a tough, reinforced fiber-rubber structure. These air spaces provided areas into which the surrounding material may be displaced by the application of pressure, eliminating the necessity for the massive flow of the entire body and preventing build-up of pressure as the thickness is reduced. The material which surrounds the voids, on the other hand, acts as a multitude of tiny, almost microscopic springs which push back against the web surface.

An impregnated fibrous web which is particularly suited for use in the present invention is disclosed in U.S. Patent No. 3,147,698, the disclosure of which is incorporated herein to the extent applicable. A particularly preferred cushioning material is a porous felted fibrous sheet impregnated with an elastomeric material, having a firmness such that a pressure of at least about 10 pounds per square inch must be exerted on the sheet to effect an initial compression of 2 mils and a residual porosity at 4 mils compression of at least about 37%.

The above-described foamed materials are rendered compressible by the confinement of the foamed layer between non-stretchable, dimensionally stabilizing layers, e.g., the plastic printing material on one side and a fabric on the opposite side.

Since the novel cushioning material in the printing plates of the present invention obviates the need for excessive pressures to overcome any unevenness of the printing plate surface, the embossing of the paper during the printing operation is eliminated and the distortion of the surface image of the plate is substantially lessened.

The following non-limiting example illustrates the preparation of a printing plate within the scope of the present invention.

*Example*

A compressible element was prepared by impregnating a cotton linter paper of 121 pound ream weight with a composition comprising medium acrylonitrile copolymer latex and 10% by weight melamine resin (Parez 613) based on the solids of the acrylonitrile copolymer. The impregnated paper had a weight of impregnant pickup equal to the weight of the fibers. The impregnated sheet was then dried, lightly calendered and heated to a temperature of 300° F. for about 20 minutes. The thickness of the compressible material was about 30 mils. A thin layer of a mixture of phenol formaldehyde resin and Buna N was applied to one side of the compressible material as a barrier coat to prevent strike-in by the printing layer.

A polyvinyl chloride plastisol composition containing 11% by weight of carbon black was then cast onto the surface of the compressible element to provide a 35 mil layer thermoplastic printing surface. The coating was fluxed at 300° F. for 9 minutes. The durometer of the thermoplastic layer was about 60. The plate was molded by forcing the plate against a molded matrix under 500 p.s.i. at 310° F. for 8 minutes. Printing tests on the molded plate showed good ink transfer to the paper stock with minimum printing pressure. The plate required no make-ready to effect a uniform transfer of ink.

Since changes may be made in the above product without departing from the scope of the invention, it is intended that all matter contained in the above description or shown in the accompanying drawing shall be interpreted as illustrative and not in a limiting sense.

What is claimed is:

1. A printing plate comprising in sequence a polymeric printing layer, a barrier layer and a volume-compressible, resilient member adhered to said layer, said member comprising a porous, fibrous web impregnated with an elastomeric material wherein said member has a firmness such that a pressure of at least about 10 pounds per square inch much be exerted on the material to effect an initial compression of 2 mils, and a residual porosity at 4 mils compression of at least about 37%, said barrier layer adapted to prevent said printing layer from striking into said member.

2. A molded printing plate comprising in sequence a polymeric printing layer containing a raised printing surface thereon, a barrier layer and a member comprising a porous, fibrous web impregnated with an elastomeric material adhered to said layer wherein said member has a firmness such that a pressure of at least about 10 lbs. per square inch must be exerted on the material to effect an initial compression of 2 mils, and a residual porosity at 4 mils compression of at least about 37 percent, said barrier layer adapted to prevent said printing layer from striking into said member.

References Cited

UNITED STATES PATENTS 3,238,086 3/1966 Tompkins ----------- 101—395

DAVID KLEIN, *Primary Examiner.*

WILLIAM B. PENN, ROBERT E. PULFREY, *Examiners.*

J. A. BELL, *Assistant Examiner.*